(12) United States Patent
Romero Guzman et al.

(10) Patent No.: US 12,418,668 B2
(45) Date of Patent: Sep. 16, 2025

(54) ALIAS-FREE COMPRESSION OF CONTENT USING ARTIFICIAL NEURAL NETWORKS

(71) Applicant: QUALCOMM Incorporated, San Diego, CA (US)

(72) Inventors: David Wilson Romero Guzman, Amstelveen (NL); Gabriele Cesa, Diemen (NL); Guillaume Konrad Sautiere, Amsterdam (NL); Yunfan Zhang, Amsterdam (NL); Taco Sebastiaan Cohen, Amsterdam (NL); Auke Joris Wiggers, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 371 days.

(21) Appl. No.: 18/188,070

(22) Filed: Mar. 22, 2023

(65) Prior Publication Data

US 2024/0323415 A1 Sep. 26, 2024

(51) Int. Cl.
*H04N 19/42* (2014.01)
*G06T 3/4046* (2024.01)
*H04N 19/182* (2014.01)

(52) U.S. Cl.
CPC ........... *H04N 19/42* (2014.11); *G06T 3/4046* (2013.01); *H04N 19/182* (2014.11)

(58) Field of Classification Search
CPC ...................................................... H04N 19/42
USPC ..................................................... 375/240.26
See application file for complete search history.

(56) References Cited

U.S. PATENT DOCUMENTS

| | | | |
|---|---|---|---|
| 2019/0355103 A1* | 11/2019 | Baek | ................... G06T 5/60 |
| 2022/0309633 A1* | 9/2022 | Davies | ................. G06V 10/82 |
| 2023/0065862 A1* | 3/2023 | Karabutov | ........... G06V 10/761 |
| 2023/0154055 A1* | 5/2023 | Besenbruch | ........... G06N 3/047 |
| | | | 375/240.03 |

OTHER PUBLICATIONS

Karras T., et al., "Alias-Free Generative Adversarial Networks", 35th Conference on Neural Information Processing Systems (NeurIPS 2021), arXiv:2106.12423v4 [cs.CV] Oct. 18, 2021, 31 Pages.

* cited by examiner

*Primary Examiner* — Yulin Sun
(74) *Attorney, Agent, or Firm* — Patterson + Sheridan, L.L.P.

(57) ABSTRACT

Certain aspects of the present disclosure provide techniques and apparatus for encoding content using a neural network. An example method generally includes encoding video content into a latent space representation through an encoder implemented by a first machine learning model. A code is generated by upsampling the latent space representation of the video content. A prior is calculated based on a conditional probability of obtaining the upsampled latent space representation conditioned by the latent space representation of the video content. A compressed version of the video content is generated based on a probabilistic model implemented by a second machine learning model, the generated code, and the calculated prior, and the compressed version of the video content is output for transmission.

22 Claims, 9 Drawing Sheets

ALIAS-FREE COMPRESSION OF CONTENT USING ARTIFICIAL NEURAL NETWORKS

INTRODUCTION

Aspects of the present disclosure relate to machine learning and, more particularly, to using artificial neural networks to compress data, such as video content.

Data compression techniques may be used to reduce the size of content for various reasons, including to improve the efficiency of storage and transmission, and to match the intended use (e.g., an appropriate resolution of data for the size of a device's display). Data compression may be performed using lossy techniques such that the decompressed version of the data is an approximation of the original data that was compressed or by using lossless techniques that result in the decompressed version of the data being equivalent to the original data.

Generally, lossless compression may be used where data should not be lost in compression, such as in compressing archives of files. In contrast, lossy compression may be used where an exact reproduction of the original data is not needed (e.g., in compressing still images, video, or audio, where some data loss, such as losses in the fineness of color data or in audio frequencies at extremes of the audible spectrum, can be tolerated).

The bitrate at which data is compressed generally is inversely proportional to the quality of the recovered data. That is, a reconstruction of data compressed using a low compression bitrate may be less similar to the original data than a reconstruction of data compressed using a higher bitrate. For example, in video content compressed using low bitrate compression models, artifacts such as flickering artifacts or other artifacts may appear in the reconstruction of the video content. As the bitrate increases (e.g., where video content is compressed using higher bitrates defined a priori by a compression model or using adaptive compression in which a model chooses the bitrate at which different portions of an input are compressed), the frequency at which these artifacts appear may be reduced.

Accordingly, what is needed are improved techniques for compressing content.

BRIEF SUMMARY

Certain aspects provide a method for encoding content using a neural network. An example method generally includes encoding video content into a latent space representation through an encoder implemented by a first machine learning model. A code is generated by upsampling the latent space representation of the video content. A prior is calculated based on a conditional probability of obtaining the upsampled latent space representation conditioned by the latent space representation of the video content. A compressed version of the video content is generated based on a probabilistic model implemented by a second machine learning model, the generated code, and the calculated prior, and the compressed version of the video content is output for transmission.

Certain aspects provide a method for decoding encoded content using a neural network. An example method generally includes receiving a compressed version of an encoded video content, the encoded video content being based on an upsampled latent space representation of source video content. A latent space representation of the source video content is recovered through a probabilistic model implemented by a first machine learning model based on a prior defined as a conditional probability of obtaining the upsampled latent space representation conditioned by the latent space representation of the video content. The encoded video content is reconstructed from the recovered latent space representation of the source video content through a decoder implemented by a second machine learning model, and the reconstruction of the encoded video content is output.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
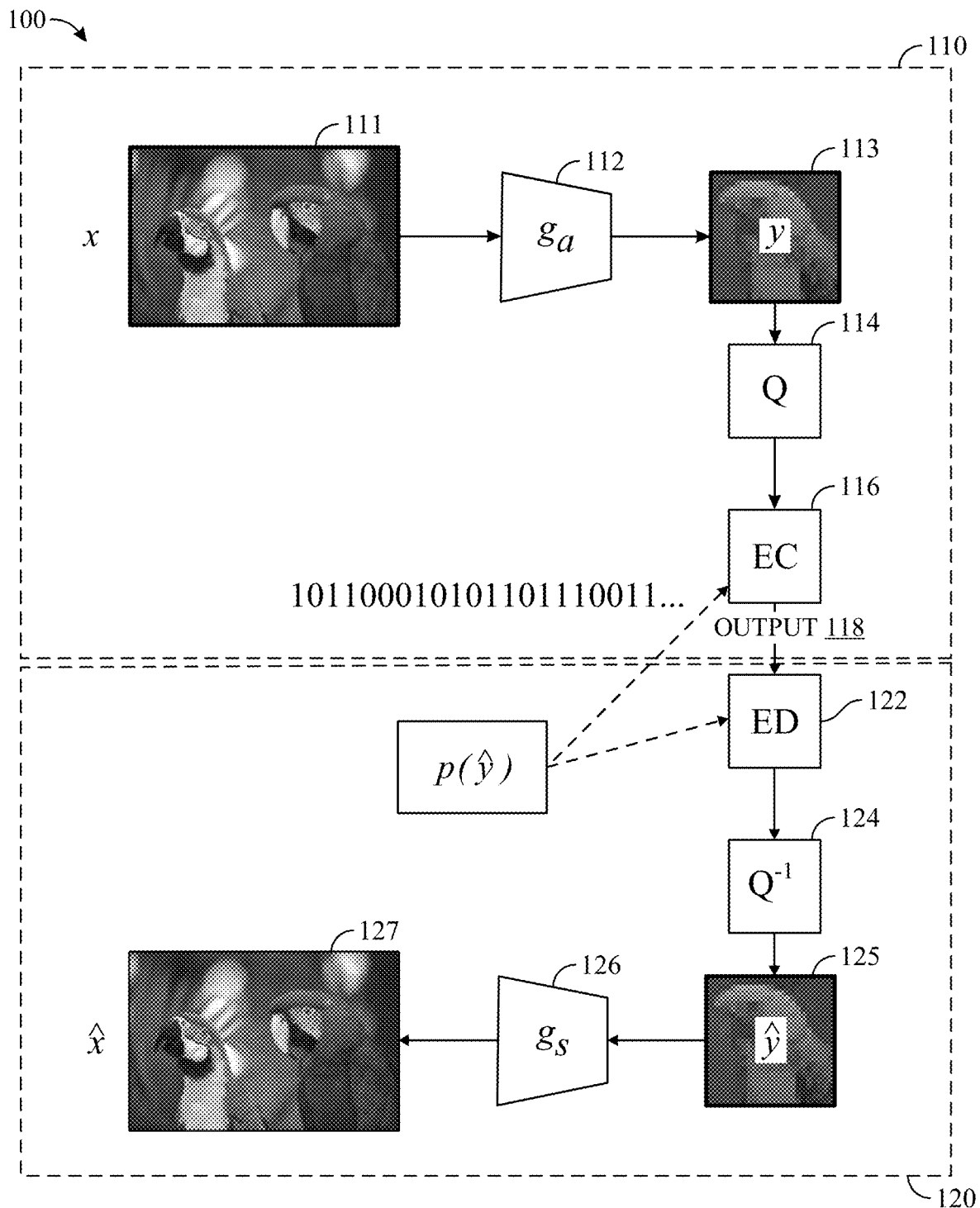
FIG. 1 depicts an example neural-network-based data compression pipeline.

Aspects of the present disclosure provide techniques for progressively compressing content using artificial neural networks such that a single model can be used to encode content at varying bitrates or levels of quality.

Neural-network-based data compression systems can be used for compression various types of data. For example, neural-network-based data compression can be used to compress various type of content that is amenable to compression. This content may include, for example, video content, image content, audio content, sensor content, and other types of data that are amenable to compression. Generally, neural-network-based data compression may compress content using a bitrate that is determined a priori based on a tradeoff between the size of the encoded content and distortion (a difference between the original content and the decompressed content). In many data compression systems, higher bitrates (e.g., larger numbers of bits used to represent the content to be compressed) may be associated with lower distortion, while smaller bitrates may be associated with higher distortion. The tradeoff between distortion D and bitrate R may be represented by the equation $$\min_\theta \mathbb{E}_x[D_\theta(x) + \beta R_\theta(x)],$$

where θ represents parameters in an auto-encoder which are optimized from end-to-end (e.g., using stochastic gradient descent methods), and β represents a weight applied to a bitrate R. The auto-encoder is generally a neural network including an encoder that encodes an input to a code in a code space and a decoder that generates an approximation of the input from the code. In data compression schemes, the auto-encoder can thus generate a compressed version of an input by encoding original input data into a code in the code space. This code can then be decompressed in order to access the original input data, or at least a reconstruction of the original input data.

In traditional, non-machine-learning-based compression schemes for video content, such as those used in High Efficiency Video Coding (HEVC) scheme, or the like, video content may be compressed without the appearance of flickering artifacts, which are generally artifacts in which frequent changes in luminance (brightness) and/or chrominance (color) appear when the compressed visual content is decompressed and output for display. However, in machine-learning-model-based compression, such as low bitrate hyperprior models in which data is compressed using information about a prior frame in video content, flickering artifacts may be present when the encoded, compressed video content is decoded and decompressed. For example, these flickering artifacts may often appear in static scenes and in areas of visual content having low luminance. Such flickering artifacts generally represent a degradation in the quality of the decoded, decompressed video content relative to the original content which may negatively impact the usefulness of machine learning-based video compression schemes.

Machine learning models can encode video on a per-patch basis, in which a patch corresponds to a specific location (e.g., a pixel or group of pixels) in the video content (or at least a temporal portion of the video content, such as a frame or group of frames in the video content). Generally, where a patch in a frame at time t and the same patch in a frame at time t+1 do not change (e.g., are background visual content), the code should remain the same, and the reconstruction of the patch should not change. Further, the code into which a patch is encoded and the reconstruction of the patch should be location-independent, such that a patch with a given set of pixel values is encoded into the same code regardless of where the patch is located, and should be independent of changes occurring in locations that are far away from the location of the patch (e.g., are located in a different, non-contiguous, portion of a frame from the patch). For example, static background content (e.g., in a corner of a frame) should be encoded into the same, or at least a similar, code, regardless of changes that may be occurring in dynamic foreground content (e.g., in the center of the frame). Location independence may also be referred to as the property of equivariance, and independence of changes occurring in locations that are far away from the location of the patch may also be referred as the property of locality. In low-bitrate compression, which may use coarse quantization of a latent space representation of an input into one of a small number of quantization bins (or values) to compress an input, these flickering artifacts indicate that the machine learning models used for such compression do not comply with the equivariance and locality properties. The coarse quantization of the latent space representation used to generate the compressed version of the input generally may be the cause of these flickering artifacts and other artifacting that may be present in compressed video content.

Aspects of the present disclosure provide techniques that use upsampling techniques to reduce or minimize the introduction of artifacts into compressed video content. As discussed in further detail herein, upsampling may be performed on a latent space representation of video content after encoding the video content into a latent space and prior to quantization. By upsampling a latent space representation of video content prior to quantization, aspects of the present disclosure may reduce or minimize artifacting, such as aliasing of high frequency data, flickering, and the like, in video compression. Further, because a latent space representation of video content is upsized, and not the actual video content, aspects of the present disclosure may efficiently preserve detail when compressing input video content using machine learning models, as compression may be performed on the input video content without incurring the computational expense of upsampling the input video content prior to compression.

Example Neural-Network-Based Data Compression Pipeline

FIG. 1 depicts an example neural-network-based pipeline 100 for training a neural network to compress data, according to aspects of the present disclosure. Pipeline 100 is generally configured to train the neural network to generate a compressed bitstream from received content x 111 from which an approximation x̂ 127 of content x 111 can be recovered. As illustrated, pipeline 100 includes an encoding side 110 and a decoding side 120. The encoding side 110 may also be referred to as a transmitter and may correspond to system 700 illustrated in FIG. 7 on which operations 500 illustrated in FIG. 5 may be performed, and the decoding side 120 may also be referred to as a receiver and may correspond to system 800 illustrated in FIG. 8 on which operations 600 illustrated in FIG. 6 may be performed.

Generally, an encoding side 110 of pipeline 100 includes a convolutional neural network (CNN)-based nonlinear transformation layer ($g_a$) 112 that maps content x 111 to a code y 113 in a latent code space, a quantizer 114 implementing a learned quantization scheme (Q) that compresses the code y 113 in the latent code space, and an entropy coder 116 that generates a bitstream representing a quantized version of the content. In this pipeline, compression may be achieved both by encoding content x 111 into code y 113 in the latent code space and by quantizing code y 113. The latent code space may be a compressed space in a hidden layer of a neural network into which content can be mapped. Codes in the latent code space generally represent losslessly compressed versions of the input data to which these codes are mapped so that the features of the input data, which may exist in multiple dimensions, are reduced to a more compact representation. The output 118 of entropy coder 116 may be transmitted to the decoding side 120 of pipeline 100 or stored for retrieval and decoding at a later point in time.

On the decoding side 120 of pipeline 100, an entropy decoder 122 recovers a quantized version of the content, and an inverse quantization scheme ($Q^{-1}$) 124 recovers an approximated code ŷ. A CNN-based nonlinear transformation layer ($g_s$) 126 may then generate the approximation x̂ of content x from the approximated code ŷ and output the approximation x̂ of content x (e.g., for display on a user device or for storage in a persistent data store from which compressed content may be retrieved for transmission to a user device).

Training losses entailed in neural-network-based data compression may be represented as a sum of an amount of distortion (e.g., calculated between the content x 111 and the approximation x 127 of content x 111) and a rate parameter δ, which generally represents a compression bitrate. As discussed above, increasing δ generally results in increased quality and decreased amounts of compression. If the compression bitrate is increased, the resulting compressed version of input data may have a larger size than if compression bitrate is smaller. Thus, increases in the compression bitrate generally result in corresponding increases in the amount of data to be transmitted, which may increase the amount of power consumed to transmit and receive the data, the amount of network resources used to transmit the compressed version of the input data, the amount of storage used in storing the compressed version of the input data, and so on.

Example Alias-Free Compression of Content Using Artificial Neural Networks

Figure 2:
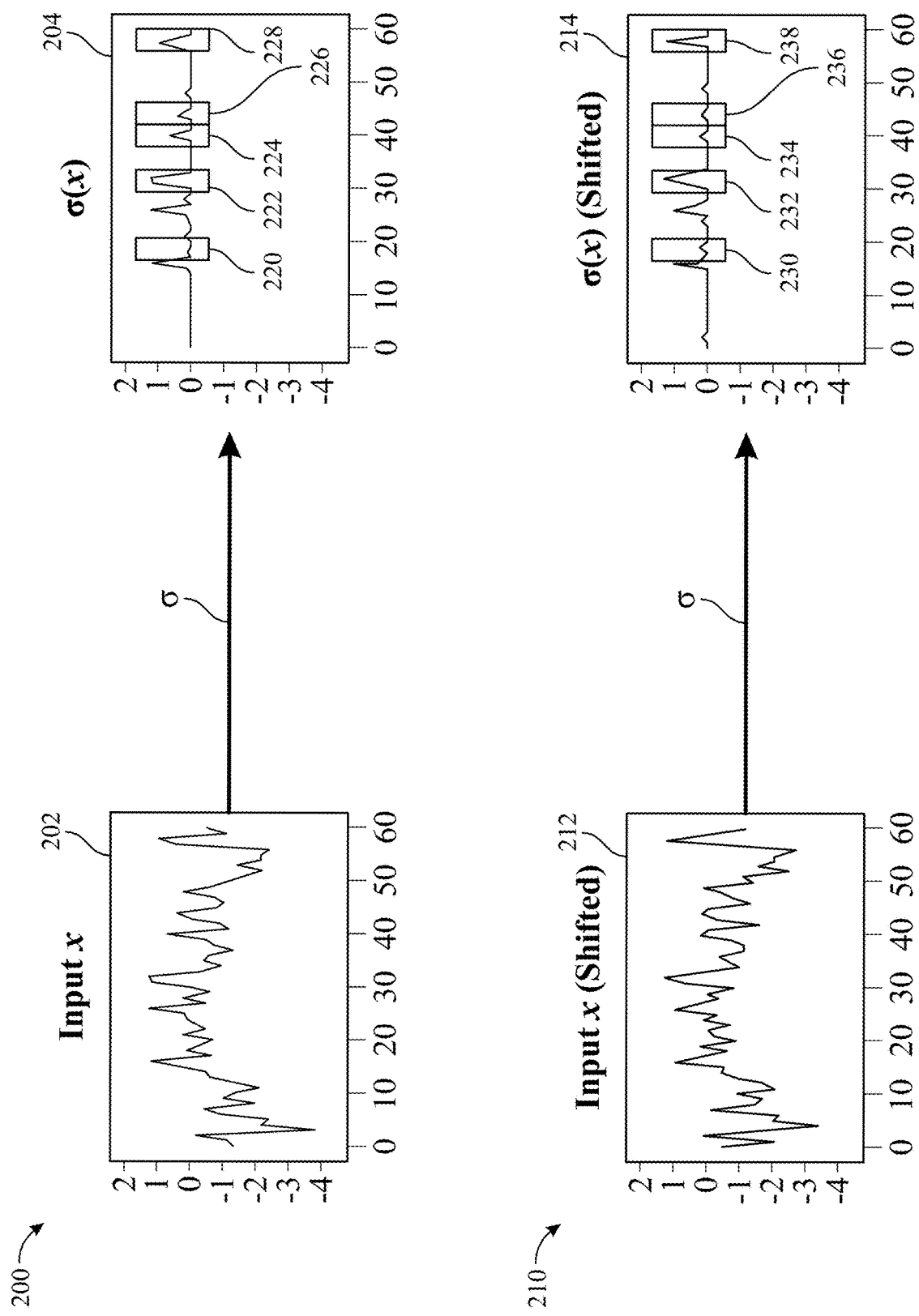
FIG. 2 illustrates example encodings of an input and a shifted input.

FIG. 2 illustrates examples 200, 210 of encoding an input and a shifted version of the input using a machine learning model, such as a model implemented using an artificial neural network. Generally, using a neural network, an input $x \in \mathbb{R}^{W \times H \times C}$ may be encoded via an encoder into a compressed version $y = \sigma(x) \in \mathbb{R}^{W \times H \times C}$, where W represents the width dimension of the input x, H represents the height dimension of the input x, C represents the channel dimension of the input x (e.g., luminance channels, chrominance channels, depth channels, etc.), and σ represents an activation function applied to the input x. While x may be a three-dimensional input, it should be recognized that x is illustrated in FIGS. 2 and 3 for simplicity as one-dimensional representations. Thus, for input x 202, a machine learning model would generate code σ(x) 204. Likewise, for input $x_{shifted}$ 212, a machine learning model would generate code $\sigma(x_{shifted})$ 214.

In this example, $x_{shifted}$ 212 may be translated by a small amount, such as a half pixel, relative to x 202. However, as illustrated, the post-activation version σ(x) 204 for x 202 and the post-activation version $\sigma(x_{shifted})$ 214 for $x_{shifted}$ 212 may be significantly different even though x and $x_{shifted}$ are substantially similar. As illustrated, small differences in x and $x_{shifted}$ may result in significant changes in post-activation versions of these samples, both in maximum value and in rate of change. These significant changes in the post-activation versions of samples x and $x_{shifted}$ may correspondingly result in artifacting, such as flickering, in the decompressed version of compressed video content. The peak value at window 220, as illustrated, is significantly smaller for post-activation version σ(x) 204 of x 202 than the peak value at corresponding window 230 post-activation version $\sigma(x_{shifted})$ 214 of $x_{shifted}$ 212. In another example, while window 222 in post-activation version σ(x) 204 of x 202 has an area in which values are increasing more slowly prior to reaching a peak value, corresponding window 232 in post-activation version $\sigma(x_{shifted})$ 214 of $x_{shifted}$ 212 illustrates that a peak value is reached on a consistent slope prior to an immediate decrease in value. In still other examples, the maximum values at windows 224 and 226 in post-activation version σ(x) 204 of x 202 are larger than the maximum values at corresponding windows 234 and 236 in post-activation version $\sigma(x_{shifted})$ 214 of $x_{shifted}$ 212. Finally, at window 228, it can be seen that the slope of the line up to the maximum value in post-activation version σ(x) 204 of x 202 is smaller than the slope of the line up to the maximum value at corresponding window 238 in post-activation version $\sigma(x_{shifted})$ 214 of $x_{shifted}$ 212.

Because of the differences in the resulting codes 204 and 214 of inputs 202 and 212, using information about code 204 as a prior in determining the proper encoding 214 for shifted input 212 may result in the introduction of aliasing into a compressed version of input 212. Generally, aliasing may appear when the sampling rate is lower than the rate needed to represent high-frequency data (e.g., where the sampling rate is lower than the Nyquist frequency), which may result in various artifacting in reconstructed visual content (e.g., grid-sticking artifacts in images) caused by non-linearities introduced by higher-frequency content in the feature space for a neural network. This aliasing may result, for example, from a breakdown in local translation equivariance, as a code into which a portion of input x 202 is encoded may not be the code into which the corresponding portion of input $x_{shifted}$ 212 is encoded, despite these portions of inputs x 202 and $x_{shifted}$ 214 sharing many similarities due to the small translation applied to input x 202 to result in input $x_{shifted}$ 214.

To preserve equivariance during the encoding process for small translations, such as that illustrated in FIG. 2, input x can be upsampled prior to encoding into a code in a latent space and quantization of the code into a compressed version of input x. However, upsampling input x prior to encoding may impose a processing overhead in order to perform such upsampling. For example, upsampling an input image x by a factor of 2 (e.g., from W×D to 2 W×2D) may result in an input that is four times the size of the original input image x. Thus, an input x having a resolution of N for which any signal bandlimited to frequency B may admit to the generation of a discrete feature map with a resolution of N=2B. Meanwhile, upsizing input x to a resolution of 2N for which a signal is bandlimited to frequency B, using pixel factorization, may allow for the generation of a smooth discrete feature map with resolution 2N=4B. In this case, neighboring pixels are strongly correlated (as one pixel in the original input x may be upsized into four pixels with similar values, with the similarity being related to the method by which input x is upsized and the values of surrounding pixels in input x). However, because a pixel-factorized prior probability distribution used in a neural network does not assume that any correlation exists between neighboring pixels, each pixel in upsized input x is encoded independently, and similar pixels (or pixels that are otherwise strongly correlated) may be encoded similarly. Thus, the size of a message representing the compressed version of the upsized input x may also be significantly larger (e.g., up to four times larger) than the size of a message representing a compressed version of input x prior to upsampling.

To allow for equivariance to be preserved during the encoding process while minimizing the computational expense of upsampling, aspects of the present disclosure apply upsampling to a latent space representation of an input x prior to processing the upsampled latent space representation of the input x using non-linear layers in a machine learning model to generate a compressed version of input x. By doing so, aspects of the present disclosure may allow for the encoding of an input x on a per-patch basis that accounts for correlations between different elements within a patch of pixels. As with compressing input x based on a pixel-factorized prior at a resolution of 2N, signals bandlimited to B may allow for the generation of a smooth discrete feature map with resolution 2N=4B. However, because encoding input x based on a patch-factorized prior may allow for correlations within a patch to be considered when encoding the input, entropy coding can allow for the generation of shorter messages for patches in input x containing strongly correlated pixels than for patches in input x containing weakly correlated pixels. For example, a patch of pixels having similar red, green, and blue channel luminance values may result in the generation of a smaller code for that patch than the code that may be generated for a patch of pixels having more randomized red, green, and blue channel luminance values.

To encode an input x based on an upsampling technique, which may preserve equivariance during the encoding process, input $x \in \mathbb{R}^{W \times H \times C}$ may be upsampled into input $x' \in \mathbb{R}^{2W \times 2H \times C}$. Input x' may be encoded using an encoder and activation function σ into a code $y' = \sigma(x') \in \mathbb{R}^{2W \times 2H \times C}$. In some aspects, to encode input x based on an upsampling technique, x may be encoded into code in a latent space, and the code into which x is encoded may be upsampled prior to quantization to effectively generate an upsampled input x' from input x while minimizing the computational expense involved in upsampling input x. Code y' may subsequently be band-limited and downsampled into code $y \in \mathbb{R}^{W \times H \times C}$ (e.g., via quantization), and code y may be output as the compressed version of input x. The subsequent code generated for upsampled input x' may, in some aspects, be downsampled to a desired resolution. Input x may be upsampled into upsampled input x' using transposed convolution with an ideal filter, and downsampling of code y' may be performed after band-limiting using an ideal filter. In some cases, an ideal filter may be a sinc filter that removes frequency components above a given cutoff frequency without affecting lower frequencies and has a linear phase response.

Figure 3A:
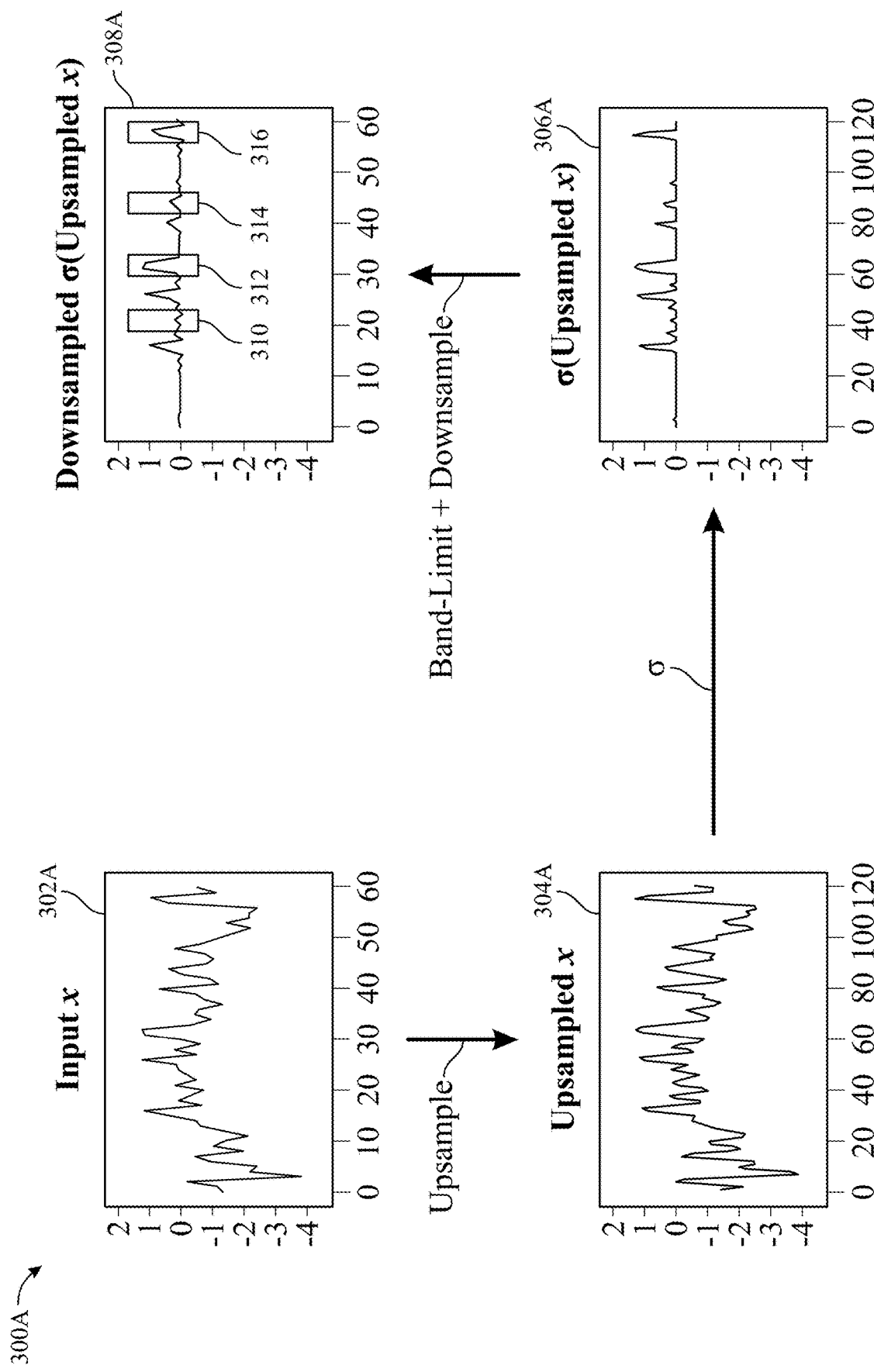
FIGS. 3A and 3B illustrate example encodings of an input and a shifted input based on upsampling of a latent space representation of the input, according to aspects of the present disclosure.
Figure 3B:
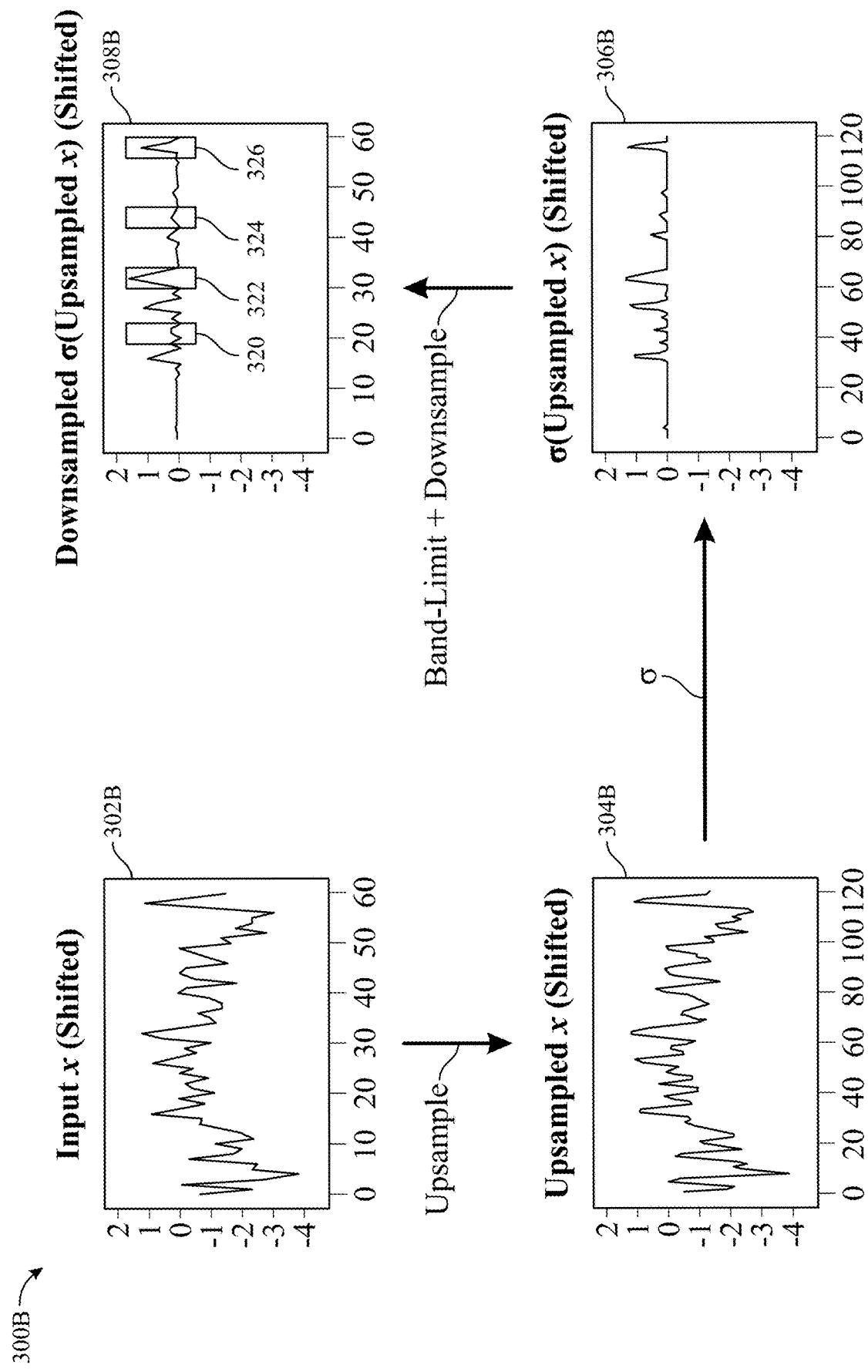

FIGS. 3A and 3B illustrate examples 300A and 300B of encodings of an input and a shifted input based on upsampling of a latent space representation of the input, according to aspects of the present disclosure.

As illustrated in example 300A, an input x 302A may be upsampled into upsampled input x' 304A by a factor of 2 (though it should be understood by one of skill in the art that any upsampling factor may be used to upsample input x 302A into upsampled input x' 304A. Upsampled input x' 304A may be encoded into code 306A, and then band-limited and downsampled into code 308A.

In example 300B, input x 302B may be a version of input x 302A shifted by a small amount (e.g., by a half pixel). Like in example 300A, input x 302B may be upsampled into upsampled input x' 304B, encoded into code 306B, and then band-limited and downsampled into code 308B.

In both example 300A and 300B, the codes 308A and 308B may be generated based on an upsampled version of a latent space representation of input x and patchwise factorization of the upsampled version of the latent space representation of input x. As discussed in further detail herein, to generate upsampled input x' 304, input x may be encoded into a code in a latent space, and this code may be upsampled by a defined factor in order to generate upsampled input x' 304. By upsampling the code prior to further processing through an activation function σ, entropy coding, and quantization, and by processing the upsampled input x' using patch-wise factorization and a patch-wise prior, a difference between codes 308A and 308B may be smaller than the difference between codes 204 and 214 illustrated in FIG. 2. For example, differences may exist between windows 310, 312, 314, and 316 in code 308A and corresponding windows 320, 322, 324, and 326 in code 308B. However, unlike the differences illustrated in FIG. 2 with respect to codes 204 and 214, the magnitude and number of differences between codes 308A and 308B may be minimized. Thus, when codes 308A and 308B are decoded into approximations of inputs 302A and 302B, respectively, the differences between the approximations of inputs 302A and 302B may also be smaller than the differences between approximations of inputs 202 and 212 from codes 204 and 214, respectively. This may correspond to a reduction in the presence of aliasing, artifacting, and other inaccuracies in the approximations of the inputs from codes representing encoded, compressed versions of these inputs. In some aspects, the downsampling illustrated in examples 300A and 300B may be performed at a receiver, after receipt of quantized and entropy-encoded data (e.g., after receipt of code 308A and 308B illustrated in FIG. 3).

Figure 4:
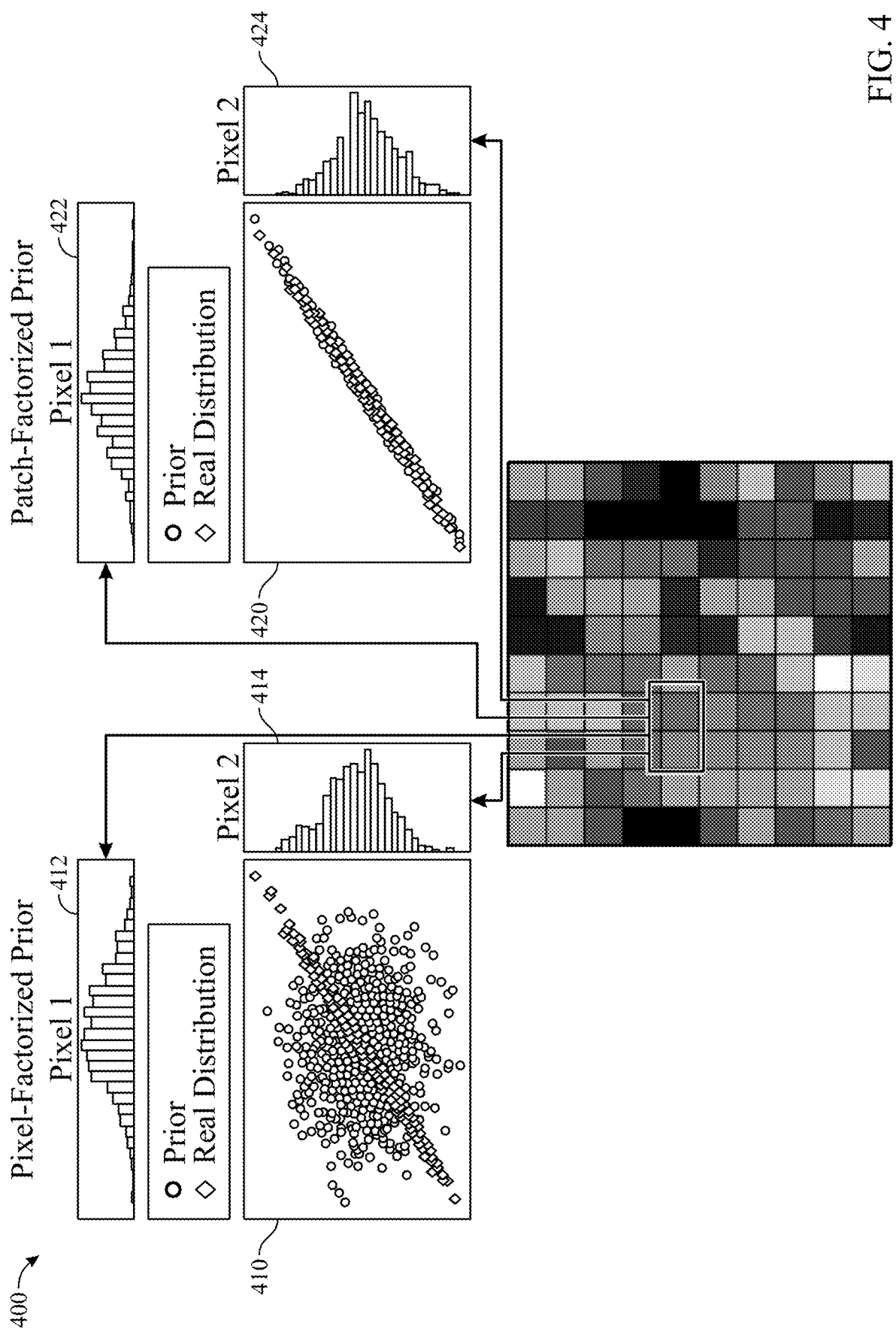
FIG. 4 illustrates an example of pixel-factorized and patch-factorized encoding of video content, according to aspects of the present disclosure.

FIG. 4 illustrates an example 400 of pixel-factorized and patch-factorized encoding of video content, according to aspects of the present disclosure.

Pixel-factorization and patch-wise factorization may generally be constructed based on a prior distribution used by the entropy coder and the entropy decoder (e.g., entropy coder 116 and entropy decoder 122, discussed above with respect to FIG. 1) in encoding and decoding video content to and from a code in a latent space. Generally, this factorization may be performed based on an already-upscaled latent, prior to quantization and encoding into a bitstream. Because the factorization may be performed on an already-upscaled latent, the codes in a latent space into which video content is encoded may already take into account correlations between different pixels in the video content.

In pixel factorization, a prior distribution 412 for a first pixel and a prior distribution 414 for a second, neighboring, pixel may be plotted in plot 410. Because the first pixel and the second pixel are factorized separately, such factorization may not take into account spatial relationships between the first pixel and the second pixel. That is, while neighboring pixels may generally have similar values (e.g., similar luminance values, regardless of whether such pixels are rendered in a greyscale or RGB color space). Thus, as illustrated in plot 410, the prior distribution may be significantly different from the real distribution of codes into which video content can be encoded.

In contrast, using patch-wise factorization, in which codes are generated for the first pixel and the second pixel as a patch of pixels, spatial information and other information defining relationships between the first pixel and the second pixel can be used in encoding the first pixel and the second pixel into codes in the latent space. To do so, an encoder can use a joint prior over the first pixel and the second pixel (or, more generally, over the pixels in any given patch of pixels) to predict an appropriate latent space representation of the pixels in the patch. As illustrated, for prior distribution 422 for the first pixel and prior distribution 424 for the second, neighboring, pixel, it may be seen in plot 420 that the prior distribution and the real distribution of codes may be substantially coextensive. Thus, encoding video content based on patch-wise factorization may result in more accurate compression and reduce the presence of visual artifacting in the reconstructed video content.

In some aspects, patch-wise factorization may be achieved by upsampling a latent space representation of the video content prior to entropy coding and quantization. In doing so, a smaller sub-component of video content may be effectively converted into a larger patch having strong correlation between neighboring components. This correlation may be exploited using a patch-wise factorization of an upsampled version of the video content itself, as the pixels within an upsized patch may generally have a stronger correlation to each other than pixels in different patches.

Subsequent decompression of quantized video content may be performed by dequantizing the quantized video content into a reconstruction of the upsampled latent space representation of the video content. This reconstruction of the upsampled latent space representation of the video content can then be downsampled into a latent space representation of the video content at a lower resolution, and the downsampled latent space representation of the video content may be processed using a neural-network-based decoder to recover an approximation of the video content. Again, because the latent space representation of the video content is upsampled during encoding and downsampled during decoding, video compression may take advantage of patch-wise factorization (as discussed above) while minimizing the processing overhead that may be incurred by upsampling the actual video content itself prior to encoding and quantization.

Figure 5:
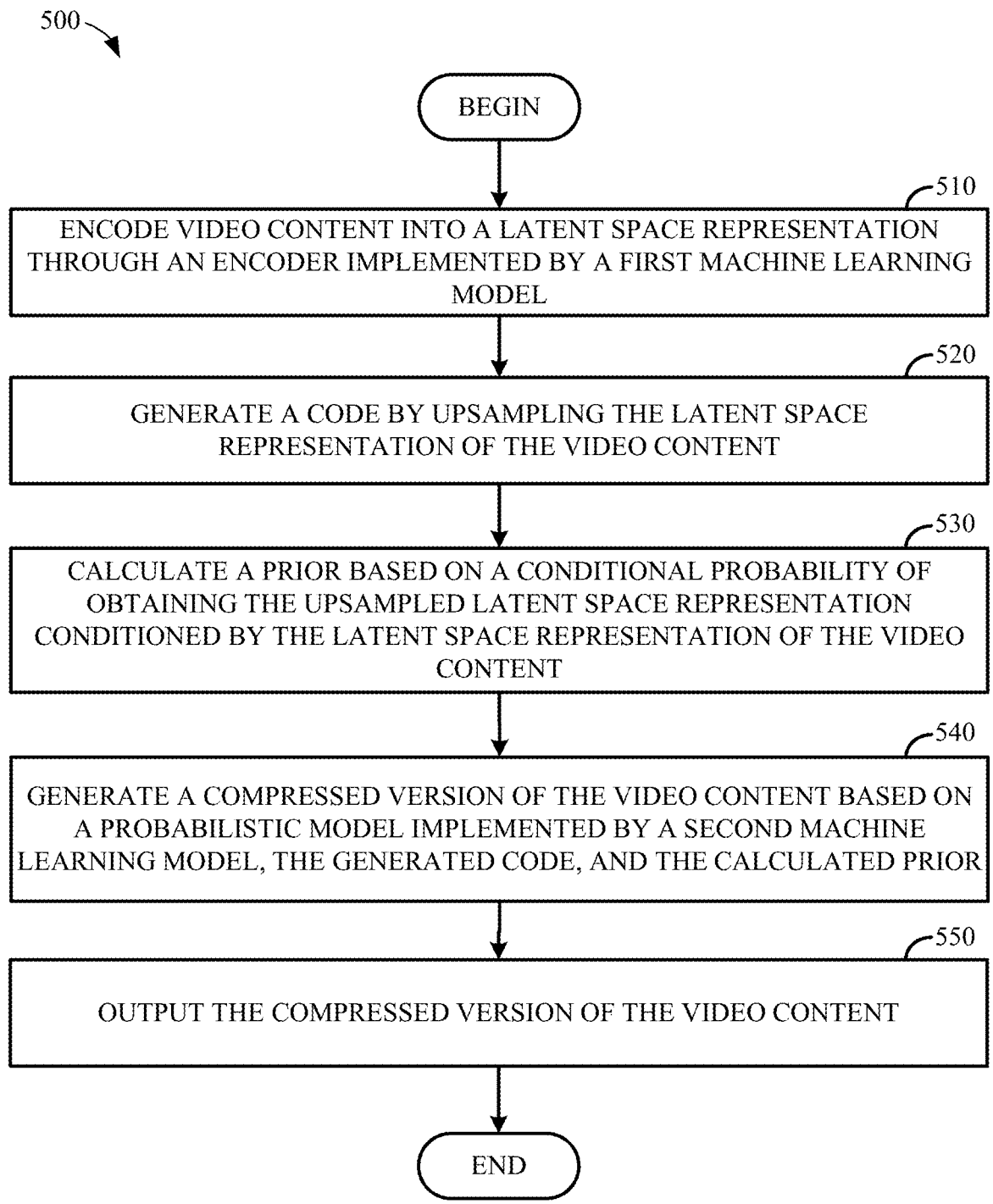
FIG. 5 illustrates example operations for alias-free encoding of video content based on machine learning models and upsampling of latent space representations of the video content, according to aspects of the present disclosure.

Example Methods for Alias-Free Compression of Content Using Artificial Neural Networks FIG. 5 illustrates example operations 500 that may be performed by a system for alias-free encoding of video content based on machine learning models and upsampling of latent space representations of the video content through an encoding pipeline, such as pipeline 100 illustrated in FIG. 1. Operations 500 may be performed by a system with one or more processors, such as processing system 700 in FIG. 7, implementing a compression pipeline including a neural-network-based encoder.

As illustrated, operations 500 may begin at block 510 with encoding video content into a latent space representation through an encoder implemented by a first machine learning model. For example, input x, representing content to be encoded, may be encoded into a latent space representation of x via a convolutional neural network (CNN)-based non-linear transformation layer ($g_a$), such as CNN-based non-linear transformation layer 112 illustrated in FIG. 1 or other machine-learning-model-based encoders that map an input x into one or more codes in a latent space. In some aspects, the encoder implemented by the first machine learning model can encode the video content into the latent space representation by quantizing the video content, or at least portions of the video content, into one of a plurality of quantization bins. The number of quantization bins may be based on the bit width of the latent space representation, with larger bit widths supporting larger numbers of finer quantization bins and smaller bit widths supporting smaller numbers of larger quantization bins. Generally, an error between the video content and the latent space representation may be decrease as the bit width, and the corresponding number of quantization bins, of the latent space representation increases.

At block 520, operations 500 proceed with generating a code by upsampling the latent space representation of the video content. As discussed, the code may be generated by upsampling the latent space representation of input x into an upsampled input x' using various upsampling techniques. Upsampling the latent space representation of input x into upsampled input x' may effectively increase the resolution of input x prior to encoding input x into a code y which may be quantized and entropy coded into a compressed version of input x and output for transmission to another device.

In some aspects, upsampling the latent space representation of the video content may include upsampling the latent space representation based on patches in the video content. Patches in the video content may generally represent specific spatial areas within a frame of the video content. A size of each patch may be based on some defined factor by which the video content is upsampled. For example, the size of each patch may have a number of pixels on a horizontal axis and a number of pixels on a vertical axis corresponding to the defined factor. If the latent space representation of the video content is upsampled by a factor of 2, the size of each patch may be two pixels wide by two pixels tall.

At block 530, operations 500 proceed with calculating a prior based on a conditional probability of obtaining the upsampled latent space representation conditioned by the latent space representation of the video content. The prior may be calculated by factorizing over patches of upsampled input x'. As discussed, by calculating a prior by factorizing over patches of upsampled input x', aspects of the present disclosure can account for correlations between pixels within a patch. Thus, patches with highly correlated pixels (e.g., pixels having similar red/green/blue luminance values, or pixels having some recognizable pattern such as alternating high and low luminance values) may result in a code associated with high probability values, and correspondingly, shorter codes when encoded using an entropy coder (e.g., such as entropy coder 116 illustrated in FIG. 1). Meanwhile, patches with loosely correlated values (e.g., pixels having random red/green/blue luminance values) may result in a code associated with low probability values, and correspondingly, longer codes when encoded using an entropy coder.

At block 540, operations 500 proceed with generating a compressed version of the video content based on a probabilistic model implemented by a second machine learning model, the generated code, and the calculated prior. The compressed version of the video content may be generated, for example, using a quantizer and/or entropy coder implemented by a machine learning model, such as quantizer 114 and/or entropy coder 116 illustrated in FIG. 1.

At block 550, operations 500 proceed with outputting the compressed version of the video content for transmission.

In some aspects, the first machine learning model may be a first artificial neural network, and the second machine learning model may be a second artificial neural network. The first artificial neural network may be an artificial neural network trained to encode an input into a latent space representation of the input. The second artificial neural network may be an artificial neural network trained to encode the latent space representation of the input into an entropy-coded bitstream having a size that is smaller than the size of the input.

Figure 6:
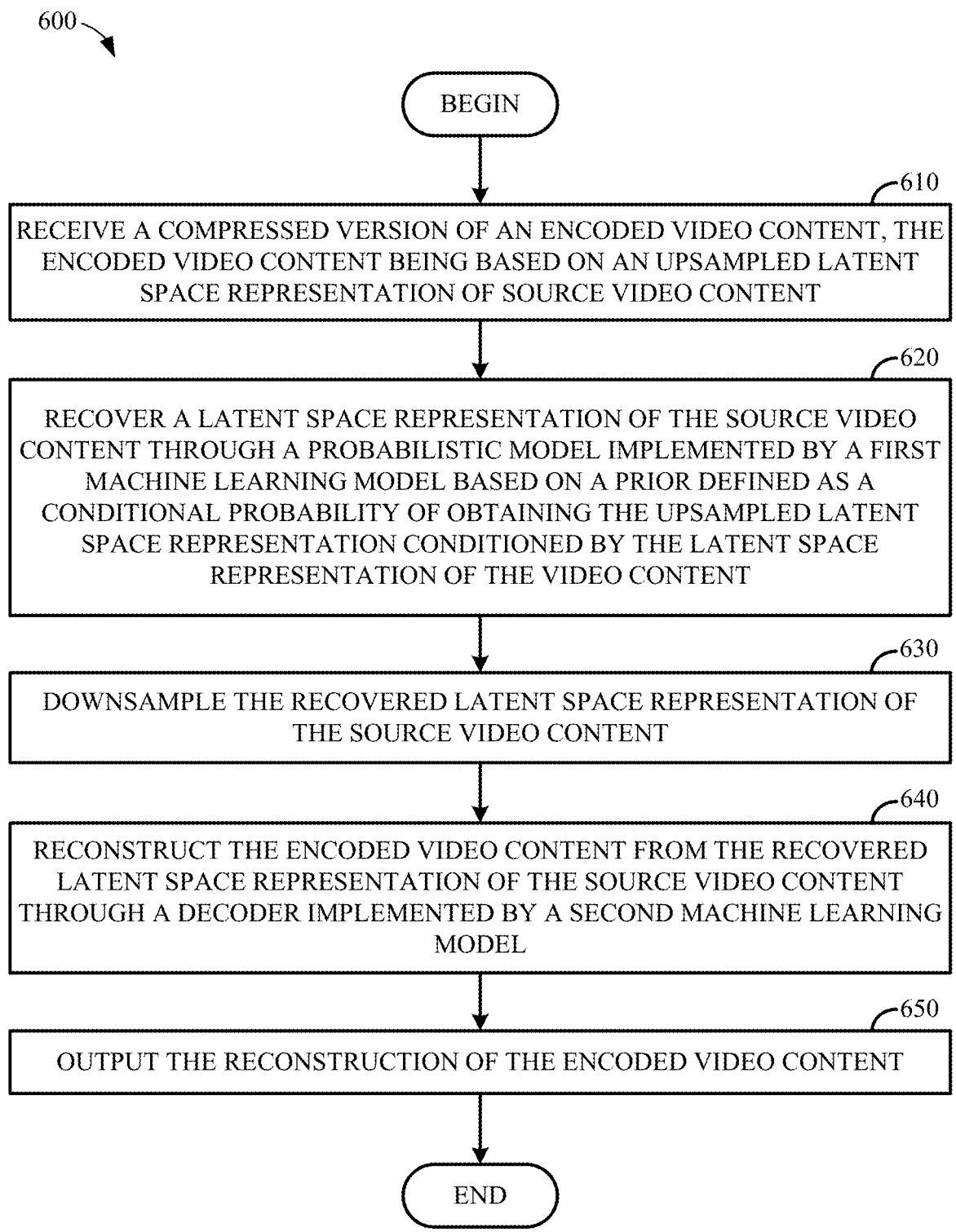
FIG. 6 illustrates example operations for decoding encoded video content encoded based on machine learning models and upsampling of latent space representations of the video content, according to aspects of the present disclosure.

FIG. 6 illustrates example operations 600 that may be performed by a system for decoding encoded video content encoded based on machine learning models and upsampling of latent space representations of the video content through a decompression pipeline, such as pipeline 100 illustrated in FIG. 1. Operations 600 may be performed by a system with one or more processors, such as processing system 800 in FIG. 8, implementing a compression pipeline including a neural-network-based decoder.

As illustrated, operations 600 may begin at block 610, with receiving a compressed version of an encoded video content. The encoded video content may be based on an upsampled latent space representation of source video content.

In some aspects, the compressed version of the encoded video content may include a bitstream downsampled from an encoded version of the upsampled latent space representation of the video content. The upsampled latent space representation may include a version of the latent space representation of the video content upsampled based on patches in the video content. Patches in the video content may generally represent specific spatial areas within a frame of the video content. A size of each patch may be based on some defined factor by which the video content is upsampled. For example, the size of each patch may have a number of pixels on a horizontal axis and a number of pixels on a vertical axis corresponding to the defined factor. If the latent space representation of the video content is upsampled by a factor of 2, the size of each patch may be two pixels wide by two pixels tall.

At block 620, operations 600 proceed with recovering a latent space representation of the source video content. The latent space representation of the source video content may be recovered through a probabilistic model implemented by a first machine learning model based on a prior defined as a conditional probability of obtaining the upsampled latent space representation, conditioned by the latent space representation of the video content.

At block 630, operations 600 proceed with downsampling the recovered latent space representation of the source video content.

At block 640, operations 600 proceed with reconstructing the encoded video content from the downsampled recovered latent space representation of the source video content through a decoder implemented by a second machine learning model.

At block 650, the reconstruction of the encoded video content is output.

In some aspects, the first machine learning model may be a first artificial neural network, and the second machine learning model may be a second artificial neural network. The first artificial neural network may be an artificial neural network trained decode an entropy-coded bitstream, having a size smaller than the source video content, into one or more codes associated with a latent space representation of the source video content. The second artificial neural network may be an artificial neural network trained to reconstruct the latent space representation of the source video content into an approximation of the source video content. Generally, a difference between the source video content and the approximation of the source video content generated from the latent space representation of the source video content may vary based on a bitrate at which the compressed version of the encoded video content was compressed (and thus decompressed), with reconstructions generated from versions of the encoded video content compressed at lower bitrates having a greater amount of difference relative to the source video content than reconstructions generated from versions of the encoded video content compressed at higher bitrates.

Example Processing System for Progressive Data Compression

Figure 7:
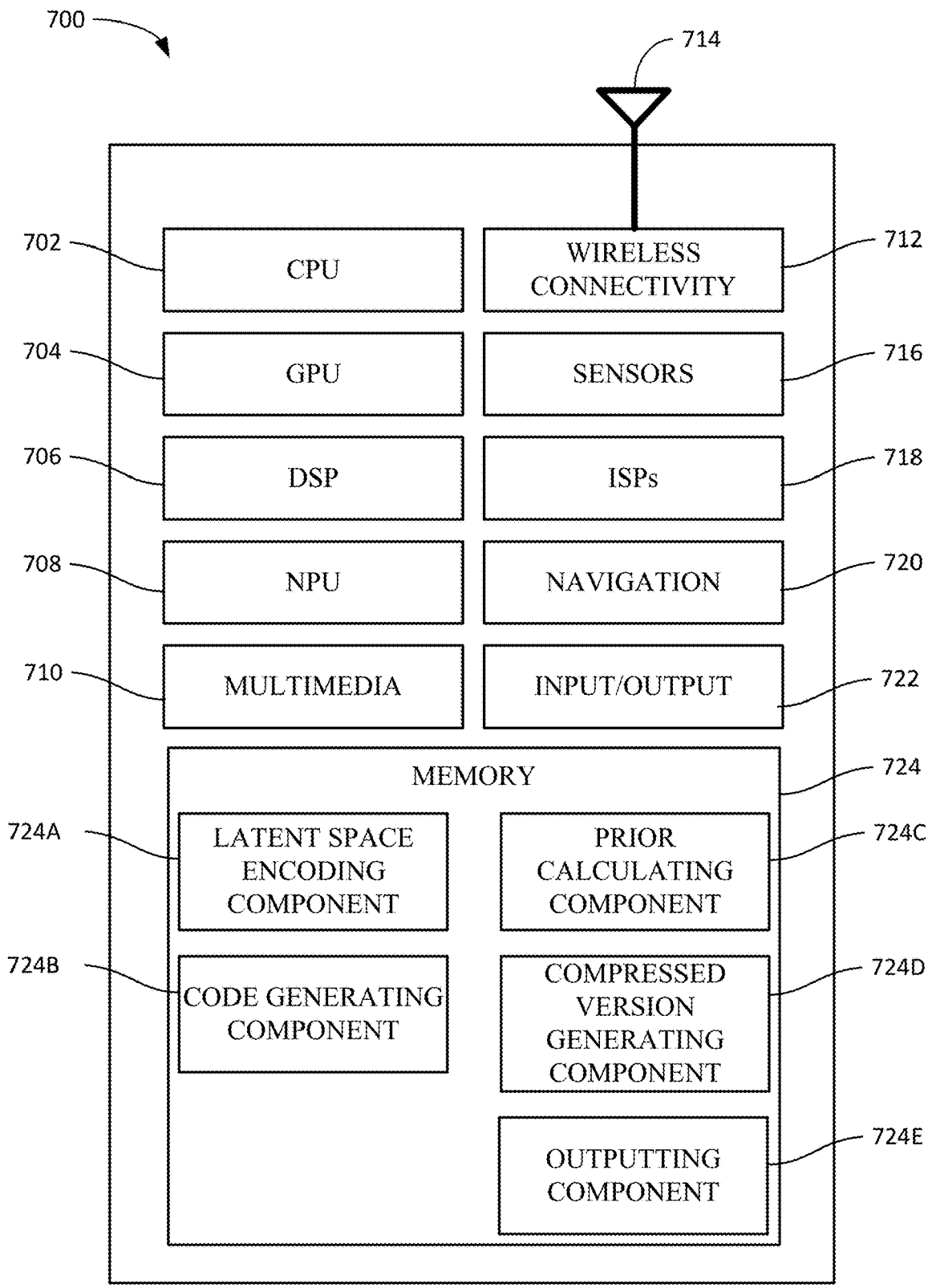
FIGS. 7 and 8 illustrate example implementations of a processing system on which encoding and decoding of video content encoded based on machine learning models and upsampling of latent space representations of the video content can be performed, according to aspects of the present disclosure.

FIG. 7 depicts an example processing system 700 for performing alias-free compression of an input using machine learning models, such as described herein for example with respect to FIG. 5.

Processing system 700 includes a central processing unit (CPU) 702, which in some examples may be a multi-core CPU. Instructions executed at the CPU 702 may be loaded, for example, from a program memory associated with the CPU 702 or may be loaded from a memory partition (e.g., from memory 724).

Processing system 700 also includes additional processing components tailored to specific functions, such as a graphics processing unit (GPU) 704, a digital signal processor (DSP) 706, a neural processing unit (NPU) 708, a multimedia processing unit 710, and a wireless connectivity component 712.

An NPU, such as 708, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), a neural network processor (NNP), an intelligence processing unit (IPU), a vision processing unit (VPU), or a graph processing unit.

NPUs, such as 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 708 is a part of one or more of CPU 702, GPU 704, and/or DSP 706.

In some examples, wireless connectivity component 712 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 712 is further connected to one or more antennas 714.

Processing system 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

Processing system 700 may also include one or more input and/or output devices 722, such as screens, touch-sensitive surfaces (including touch-sensitive displays), physical buttons, speakers, microphones, and the like.

In some examples, one or more of the processors of processing system 700 may be based on an ARM or RISC-V instruction set.

Processing system 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of processing system 700.

In particular, in this example, memory 724 includes latent space encoding component 724A, code generating component 724B, prior calculating component 724C, compressed version generating component 724D, and outputting component 724E. The depicted components, and others not depicted, may be configured to perform various aspects of the methods described herein.

Generally, processing system 700 and/or components thereof may be configured to perform the methods described herein.

Notably, in other aspects, aspects of processing system 700 may be omitted, such as where processing system 700 is a server computer or the like. For example, multimedia processing unit 710, wireless connectivity component 712, sensor processing units 716, ISPs 718, and/or navigation processor 720 may be omitted in other aspects. Further, aspects of processing system 700 may be distributed, such as training a model and using the model to generate inferences, such as user verification predictions.

Figure 8:
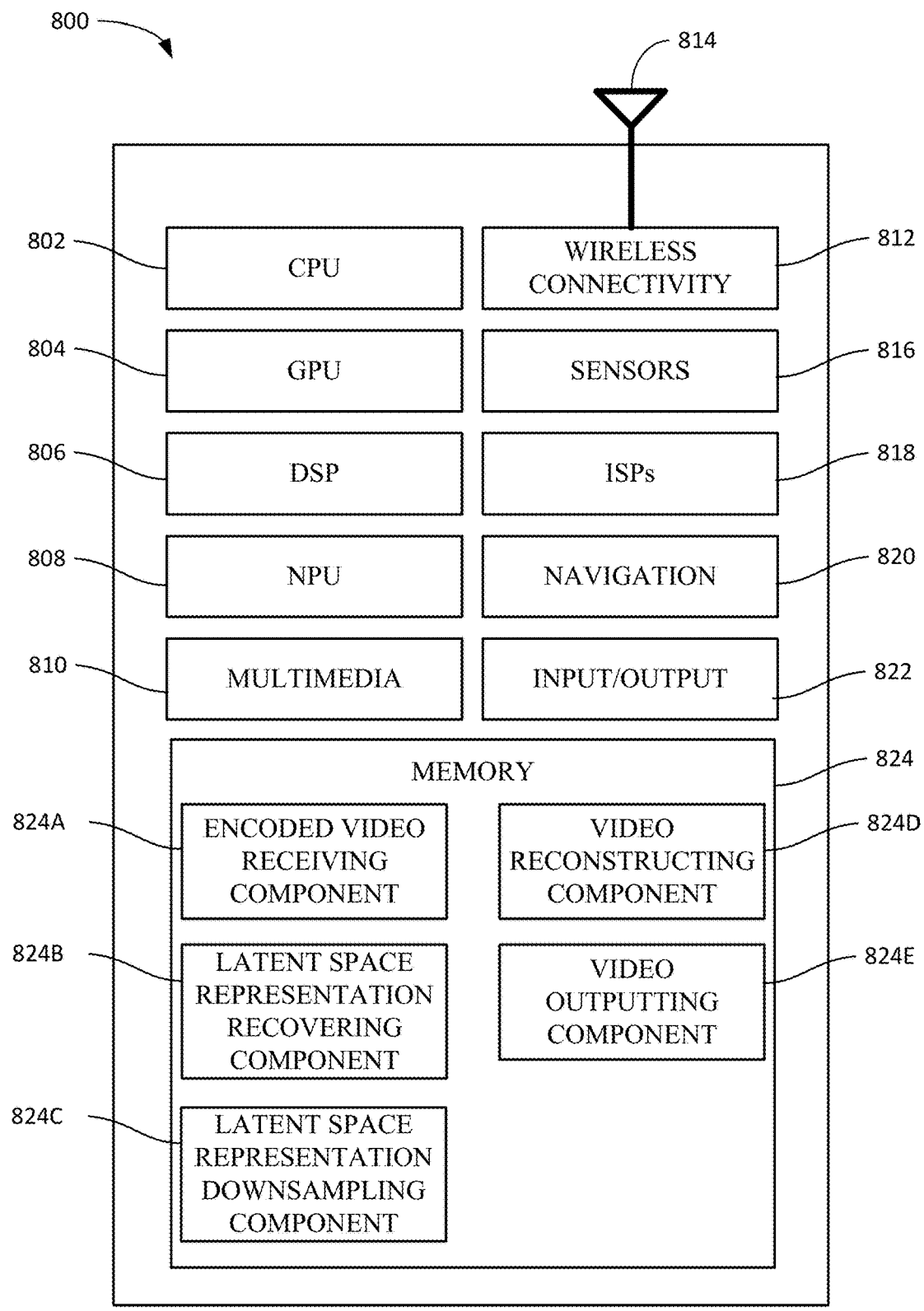

FIG. 8 depicts an example processing system 800 for performing decompression of a compressed input using machine learning models, such as described herein for example with respect to FIG. 6.

Processing system 800 includes a central processing unit (CPU) 802, which in some examples may be a multi-core CPU. Instructions executed at the CPU 802 may be loaded, for example, from a program memory associated with the CPU 802 or may be loaded from a memory partition (e.g., from memory 824).

Processing system 800 also includes additional processing components tailored to specific functions, such as a graphics processing unit (GPU) 804, a digital signal processor (DSP) 806, a neural processing unit (NPU) 808, a multimedia processing unit 810, a multimedia processing unit 810, and a wireless connectivity component 812.

An NPU, such as 808, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), a neural network processor (NNP), an intelligence processing unit (IPU), a vision processing unit (VPU), or a graph processing unit.

NPUs, such as 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 812 is further connected to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes encoded video receiving component 824A, latent space representation recovering component 824B, latent space representation downsampling component 824C, video reconstructing component 824D, and video outputting component 824E. The depicted components, and others not depicted, may be configured to perform various aspects of the methods described herein.

Generally, processing system 800 and/or components thereof may be configured to perform the methods described herein.

Notably, in other aspects, aspects of processing system 800 may be omitted, such as where processing system 800 is a server computer or the like. For example, multimedia processing unit 810, wireless connectivity component 812, sensor processing units 816, ISPs 818, and/or navigation processor 820 may be omitted in other aspects. Further, aspects of processing system 800 may be distributed, such as training a model and using the model to generate inferences, such as user verification predictions.

Example Clauses

Implementation details of various aspects of the present disclosure are described in the following numbered clauses:

Clause 1: A computer-implemented method, comprising: encoding video content into a latent space representation through an encoder implemented by a first machine learning model; generating a code by upsampling the latent space representation of the video content; calculating a prior based on a conditional probability of obtaining the upsampled latent space representation conditioned by the latent space representation of the video content; generating a compressed version of the video content based on a probabilistic model implemented by a second machine learning model, the generated code, and the calculated prior; and outputting the compressed version of the video content for transmission.

Clause 2: The method of Clause 1, wherein upsampling the latent space representation of the video content comprises upsampling the latent space representation of the video content based on patches in the video content.

Clause 3: The method of Clause 2, wherein a size of each patch is based on a defined factor by which the video content is upsampled.

Clause 4: The method of Clause 3, wherein the size of each patch comprises dimensions of the defined factor in pixels on a horizontal axis in the video content by the defined factor in pixels on a vertical axis in the video content.

Clause 5: The method of any of Clauses 2 through 4, wherein generating the code comprises upsampling each respective patch into a code in an upsampled latent space based on a correlation between pixels in the respective patch.

Clause 6: The method of any of Clauses 1 through 5, wherein the first machine learning model comprises a first artificial neural network, and wherein the second machine learning model comprises a second artificial neural network.

Clause 7: A computer-implemented method, comprising: receiving a compressed version of an encoded video content, the encoded video content being based on an upsampled latent space representation of source video content; recovering a latent space representation of the source video content through a probabilistic model implemented by a first machine learning model based on a prior defined as a conditional probability of obtaining the upsampled latent space representation conditioned by the latent space representation of the video content; downsampling the recovered latent space representation of the source video content; reconstructing the encoded video content from the downsampled recovered latent space representation of the source video content through a decoder implemented by a second machine learning model; and outputting the reconstruction of the encoded video content.

Clause 8: The method of Clause 7, wherein the compressed version of the encoded video content comprises a bitstream downsampled from an encoded version of the upsampled latent space representation of the source video content, and wherein the upsampled latent space representation comprises a version of the latent space representation of the source video content upsampled based on patches in the source video content.

Clause 9: The method of Clause 8, wherein a size of each patch is based on a defined factor by which the source video content is upsampled.

Clause 10: The method of Clause 9, wherein the size of each patch comprises dimensions of the defined factor in pixels on a horizontal axis in the source video content by the defined factor in pixels on a vertical axis in the source video content.

Clause 11: The method of any of Clauses 7 through 10, wherein the first machine learning model comprises a first artificial neural network and the second machine learning model comprises a second artificial neural network.

Clause 12: A processing system, comprising: a memory comprising computer-executable instructions; and one or more processors configured to execute the computer-executable instructions and cause the processing system to perform a method in accordance with any of Clauses 1-11.

Clause 13: A processing system, comprising means for performing a method in accordance with any of Clauses 1-11.

Clause 14: A non-transitory computer-readable medium comprising computer-executable instructions that, when executed by one or more processors of a processing system, cause the processing system to perform a method in accordance with any of Clauses 1-11.

Clause 15: A computer program product embodied on a computer-readable storage medium comprising code for performing a method in accordance with any of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
   encoding video content into a latent space representation through an encoder implemented by a first machine learning model;
   generating a code by upsampling the latent space representation of the video content;
   calculating a prior based on a conditional probability of obtaining the upsampled latent space representation conditioned by the latent space representation of the video content;
   generating a compressed version of the video content based on a probabilistic model implemented by a second machine learning model, the generated code, and the calculated prior; and
   outputting the compressed version of the video content.

2. The method of claim 1, wherein upsampling the latent space representation of the video content comprises upsampling the latent space representation of the video content based on patches in the video content.

3. The method of claim 2, wherein a size of each patch is based on a defined factor by which the video content is upsampled.

4. The method of claim 3, wherein the size of each patch comprises dimensions of the defined factor in pixels on a horizontal axis in the video content by the defined factor in pixels on a vertical axis in the video content.

5. The method of claim 2, wherein generating the code comprises upsampling each respective patch into a code in an upsampled latent space based on a correlation between pixels in the respective patch.

6. The method of claim 1, wherein the first machine learning model comprises a first artificial neural network and wherein the second machine learning model comprises a second artificial neural network.

7. A computer-implemented method, comprising:
   receiving a compressed version of an encoded video content, the encoded video content being based on an upsampled latent space representation of source video content;
   recovering a latent space representation of the source video content through a probabilistic model implemented by a first machine learning model based on a prior defined as a conditional probability of obtaining the upsampled latent space representation conditioned by the latent space representation of the source video content;
   downsampling the recovered latent space representation of the source video content;
   reconstructing the encoded video content from the downsampled recovered latent space representation of the source video content through a decoder implemented by a second machine learning model; and
   outputting the reconstruction of the encoded video content.

8. The method of claim 7, wherein the compressed version of the encoded video content comprises a bitstream downsampled from an encoded version of the upsampled latent space representation of the source video content, and wherein the upsampled latent space representation comprises a version of the latent space representation of the source video content upsampled based on patches in the source video content.

9. The method of claim 8, wherein a size of each patch is based on a defined factor by which the source video content is upsampled.

10. The method of claim 9, wherein the size of each patch comprises dimensions of the defined factor in pixels on a horizontal axis in the source video content by the defined factor in pixels on a vertical axis in the source video content.

11. The method of claim 7, wherein the first machine learning model comprises a first artificial neural network and wherein the second machine learning model comprises a second artificial neural network.

12. An apparatus, comprising:
   a memory having executable instructions stored thereon; and a processor configured to execute the executable instructions in order to cause the apparatus to:
  encode video content into a latent space representation through an encoder implemented by a first machine learning model;
  generate a code by upsampling the latent space representation of the video content;
  calculate a prior based on a conditional probability of obtaining the upsampled latent space representation conditioned by the latent space representation of the video content;
  generate a compressed version of the video content based on a probabilistic model implemented by a second machine learning model, the generated code, and the calculated prior; and
  output the compressed version of the video content.

13. The apparatus of claim 12, wherein in order to upsample the latent space representation of the video content, the processor is configured to cause the apparatus to upsample the latent space representation of the video content based on patches in the video content.

14. The apparatus of claim 13, wherein a size of each patch is based on a defined factor by which the video content is upsampled.

15. The apparatus of claim 14, wherein the size of each patch comprises dimensions of the defined factor in pixels on a horizontal axis in the video content by the defined factor in pixels on a vertical axis in the video content.

16. The apparatus of claim 13, wherein in order to generate the code, the processor is configured to cause the apparatus to upsample each respective patch into a code in an upsampled latent space based on a correlation between pixels in the respective patch.

17. The apparatus of claim 12, wherein the first machine learning model comprises a first artificial neural network and wherein the second machine learning model comprises a second artificial neural network.

18. An apparatus, comprising:
  a memory having executable instructions stored thereon; and
  a processor configured to execute the executable instructions in order to cause the apparatus to:
    receive a compressed version of an encoded video content, the encoded video content being based on an upsampled latent space representation of source video content;
    recover a latent space representation of the source video content through a probabilistic model implemented by a first machine learning model based on a prior defined as a conditional probability of obtaining the upsampled latent space representation conditioned by the latent space representation of the source video content;
    downsample the recovered latent space representation of the source video content;
    reconstruct the encoded video content from the downsampled recovered latent space representation of the source video content through a decoder implemented by a second machine learning model; and
    output the reconstruction of the encoded video content.

19. The apparatus of claim 18, wherein the compressed version of the encoded video content comprises a bitstream downsampled from an encoded version of the upsampled latent space representation of the source video content, and wherein the upsampled latent space representation comprises a version of the latent space representation of the source video content upsampled based on patches in the source video content.

20. The apparatus of claim 19, wherein a size of each patch is based on a defined factor by which the source video content is upsampled.

21. The apparatus of claim 20, wherein the size of each patch comprises the defined factor in pixels on a horizontal axis in the source video content by the defined factor in pixels on a vertical axis in the source video content.

22. The apparatus of claim 18, wherein the first machine learning model comprises a first artificial neural network and wherein the second machine learning model comprises a second artificial neural network.

* * * * *